US012718275B2

(12) United States Patent
Hubman et al.

(10) Patent No.: US 12,718,275 B2
(45) Date of Patent: Aug. 25, 2026

(54) METHODS FOR RAPID PRODUCT FORMULATION AND EFFICIENT MASS-CUSTOMIZATION

(71) Applicant: AlpStories, Inc., Atlanta, GA (US)

(72) Inventors: Danijel Hubman, Litija (SI); David Androsch, Atlanta, GA (US); Astrid Androsch, Atlanta, GA (US)

(73) Assignee: AlpStories, Inc., Atlanta, GA (US)

( * ) Notice: Subject to any disclaimer, the term of this patent is extended or adjusted under 35 U.S.C. 154(b) by 0 days.

(21) Appl. No.: 17/952,438

(22) Filed: Sep. 26, 2022

(65) Prior Publication Data

US 2023/0140331 A1 May 4, 2023

Related U.S. Application Data

(63) Continuation-in-part of application No. 17/829,242, filed on May 31, 2022, and a continuation-in-part of application No. 17/720,408, filed on Apr. 14, 2022, now Pat. No. 11,491,451, which is a continuation-in-part of application No. 17/696,954, filed on Mar. 17, 2022, now Pat. No. 12,033,200, said application No. 17/829,242 is a continuation-in-part of application No. PCT/SI2021/050008, filed on Mar. 5, 2021, application No. 17/952,438 is a continuation-in-part of application No. PCT/SI2021/050008, filed on Mar. 5, 2021, said application No. 17/696,954 is a continuation-in-part of application No. PCT/SI2021/050008, filed on Mar. 5, 2021.

(51) Int. Cl.

| | |
|---|---|
| ***G06Q 30/00*** | (2023.01) |
| ***G06Q 30/0601*** | (2023.01) |
| ***G06Q 50/04*** | (2012.01) |

(52) U.S. Cl.
CPC ..... *G06Q 30/0621* (2013.01); *G06Q 30/0627* (2013.01); *G06Q 50/04* (2013.01)

(58) Field of Classification Search
CPC . G06Q 30/0621; G06Q 30/0627; G06Q 50/04
USPC ........................................................ 700/233
See application file for complete search history.

(56) References Cited

U.S. PATENT DOCUMENTS

| | | | | |
|---|---|---|---|---|
| 11,328,338 B1 * | 5/2022 | Yuan | ...................... | A61B 5/441 |
| 2006/0265244 A1 * | 11/2006 | Baumann | .............. | A61B 5/441<br>424/59 |

(Continued)

OTHER PUBLICATIONS

He, Wei, Beauty industry gets high-tech makeover, Apr. 5, 2019, China Daily, International ed., 9. (Year: 2019).*

(Continued)

*Primary Examiner* — Jeffrey A. Smith
*Assistant Examiner* — Brittany E Bargeon
(74) *Attorney, Agent, or Firm* — Neo IP

(57) ABSTRACT

A method of providing a custom formulated product, including skincare products, is described. A user may enter user skincare data and a user skin profile may be generated from this data. The user skin profile may be mapped to skin matrix factors of a user skin profile matrix to derive a skin profile identifier. The skin profile identifier may be used to select ingredients to manufacture a custom formulated skin product, specific to the skin issues that the user identified. The custom formulated product can then be distributed directly to the user.

14 Claims, 6 Drawing Sheets

(56) References Cited

U.S. PATENT DOCUMENTS

2009/0287584 A1* 11/2009 Brown .................. G06Q 30/02 705/26.1
2013/0123973 A1* 5/2013 Saranow ........... G06Q 30/0621 700/233
2014/0279792 A1* 9/2014 Hudson ................. G16H 20/60 706/46
2015/0009775 A1* 1/2015 Vogt ................... B01F 35/7137 366/76.1
2015/0021356 A1* 1/2015 Witchell .............. B01F 33/848 222/23
2018/0075506 A1* 3/2018 Burkhard .............. B65G 23/23
2018/0189853 A1* 7/2018 Stewart .................. G07F 13/06
2019/0237194 A1* 8/2019 Salvi ....................... G06N 5/04
2022/0392598 A1* 12/2022 Giles ..................... G16H 20/10

OTHER PUBLICATIONS

Taanila, P., Designing Mass Customization: A Product Configurator for a Startup Company, 2014, Master of Arts Thesis for International Design Business Management, Aalto University of Arts, Design, and Architecture, pp. 1-109. (Year: 2014).*
https://www.provenskincare.com.

* cited by examiner

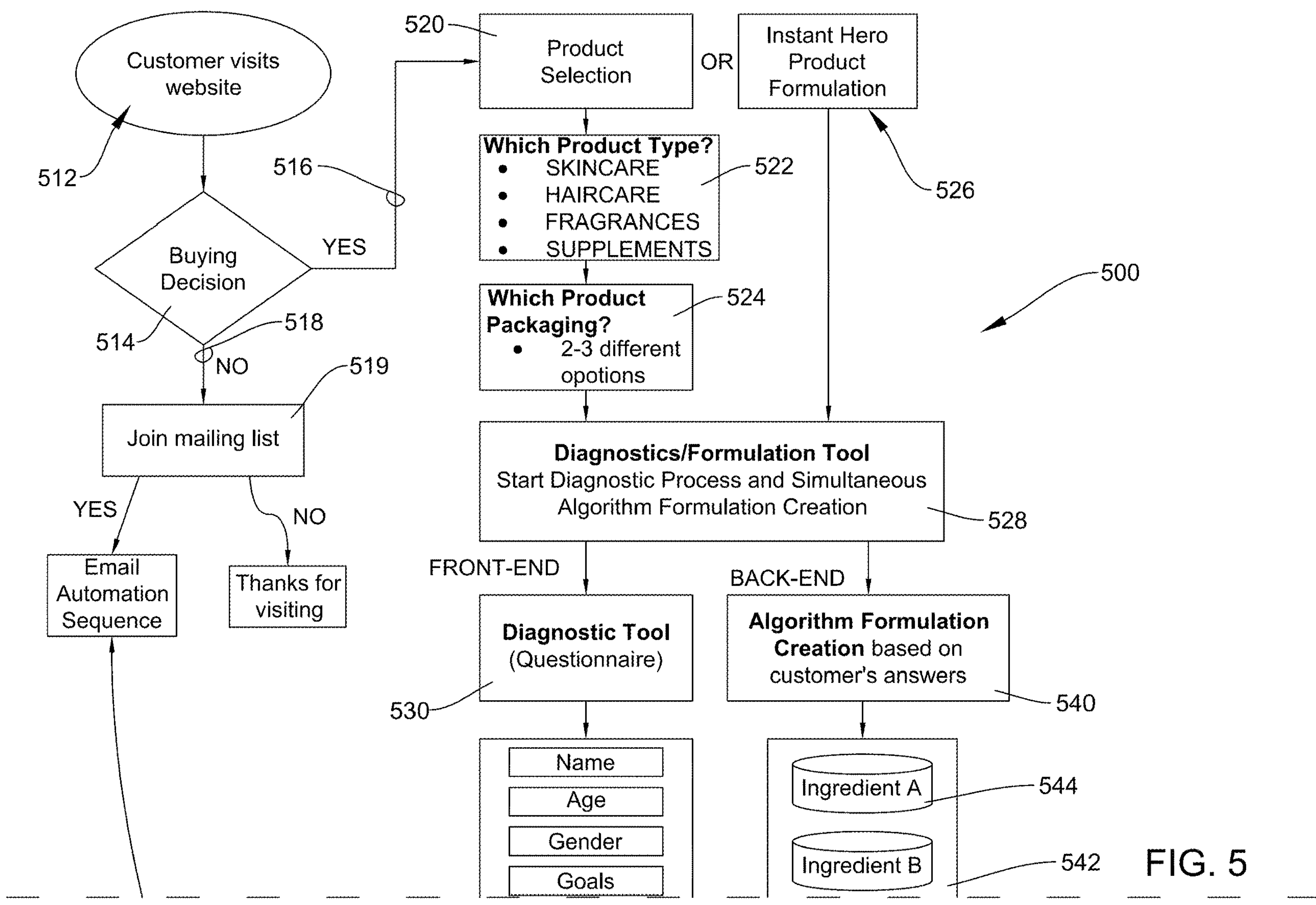
Customer visits website
512
Buying Decision
514
YES
516
NO
518
Join mailing list
519
YES
NO
Email Automation Sequence
Thanks for visiting
520
Product Selection
OR
Instant Hero Product Formulation
526
Which Product Type?
• SKINCARE
• HAIRCARE
• FRAGRANCES
• SUPPLEMENTS
522
Which Product Packaging?
• 2-3 different opotions
524
500
Diagnostics/Formulation Tool
Start Diagnostic Process and Simultaneous Algorithm Formulation Creation
528
FRONT-END
BACK-END
Diagnostic Tool (Questionnaire)
530
Algorithm Formulation Creation based on customer's answers
540
Name
Age
Gender
Goals
Ingredient A
544
Ingredient B
542
FIG. 5

METHODS FOR RAPID PRODUCT FORMULATION AND EFFICIENT MASS-CUSTOMIZATION

RELATED APPLICATIONS

Applications and patents of related continuity ("Related Applications) are disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to the creation of formulated products and, more particularly, to a system for and method of creating individually personalized formulated product.

2. Description of the Related Art

Individualized consumer products provided on a mass scale are generally rare in the current consumer marketplace. German truck manufacturer Daimler AG uses a 3D printing processes for the creation of some plastic spare parts and components in order to, inter alia, eliminate the need to inventory such components. Plastic components such as covers, spacers, spring caps, air and cable ducts, clamps, mountings and control elements are produced by additive manufacturing and 3D printing upon demand. However, such parts are limited to plastic additive manufacturing technologies, and the parts are not "personalized" but rather equivalent to the original production components, i.e., are produced from an existing limited catalog.

Personalized 3D printing technology also exists in some healthcare applications. 3D printing is used to create a portion of skull for trauma victims, and for making teeth and implants for a wide variety of dental procedures.

But "formulated" products, to date, have been unable to achieve individually personalized manufacturing. By way of example, for medicaments, a compounded medication may be custom made for an individual by a "compounding pharmacy". Such a specific type of pharmacy can make medications for people who have certain medication needs or requirements. However, such pharmacies are essentially local or regional, formulating one prescription at a time, and widespread customization of products in these and other health and beauty areas still remain universally unavailable. Some of the reasons for this are explained in greater detail below.

However, in spite of the inability of being able to "personalize" products such as skin care or cosmetic products on a large scale, there is an increasing trend toward marketing these product lines as "personalized" products. This leads to faux-personalization, both in marketing and in technology. By way of example, U.S. Pat. No. 11,328,338, issued in the name of Yuan et al. and assigned to Life Spectacular Inc. D/b/a PROVEN® Skincare, is one such typical faux-personalization method. Commercially embodied and advertised as being "personalized, clinically effective skincare formulated for you based on your skin, life and environment", the '338 patent teaches a method of providing a skincare regimen recommendation from a curated skincare product portfolio. In other words, while employing an interactive recommendation matrix that could be used to personalize a formulation, such a method instead is used only to identify a recommendation of one product from a limited number of pre-formulated products (i.e., from a curated portfolio).

Consequently, a need exists to utilize an interactive or matrix style of identifying a personalized requirement for a formulated product in order to facilitate the actual personalized, individualized formulation of such products.

SUMMARY OF THE INVENTION

It is thus objects of the present invention to provide a system and method that allow for personalized and individualized product formulation.

It is a feature of the present invention to provide a method for identifying customized skincare product requirements that is then actually used to direct the formulation and manufacturing of a personalized, individualized product that is generated from the specific identified user recommendations.

Embodiments of the methods described in the present disclosure are directed to a method for providing a custom individual skincare product to a user. Also described are methods directed to recommending and providing a skincare product formulation for personalized manufacturing of a product that addresses the identified specific needs and issues of the user. The skincare product formulation may be derived from and generated using a user skin profile matrix derived from a quiz, algorithm or diagnostic application that maps the user's skin profile with individual formulation ingredients or from a selection of individual formulation ingredients. By identifying specific formulation ingredients and quantities thereof, a personalized skincare product may be customized to the individual and specific needs and circumstances of the user.

In some examples, the present disclosure describes a method of providing a personalized skincare formulation based at least in part on a user skin profile. The method may include creating a user skin profile matrix using a set of skin matrix factors, deriving a skin profile identifier from the user skin profile matrix, using the skin profile identifier to create a selected set of skincare product ingredients, and providing the personalized formulation of the skincare product to a user. The method may also include adapting the skin profile identifier according to an anticipated change to the user skin profile to create an updated product formulation for the user and receiving user data for use in generating and adapting the user skin profile. In some examples, deriving the skin profile identifier from the user skin profile matrix may include mapping the user skin profile to the user skin profile matrix and may also include concatenating individual representative markers of each of the skin matrix factors mapped to the user skin profile. In other some examples, the method may include generating and/or adapting the user skin profile based on other non-skin factors, such as seasonal variations, environmental conditions, availability of ingredients or an anticipated change to the user skin or non-skin factors.

In some examples, the method may include any or all of generating the initial skin profile identifier by correlating the initial user skin profile to a user skin profile matrix, creating the user skin profile matrix by selecting a set of skin matrix factors that include at least one of a set of skin factors or a set of non-skin factors, and formulating the individually formulated skincare products for the user by selecting at least one base ingredient from a set of base ingredients or by selecting at least one additive from a set of additives, based at least in part on the initial skin profile identifier. In some examples, the present disclosure describes a method directed to creating a personalized skin product for a user, which may include an individualized formulation directed by selecting a set of skin matrix factors In some examples, the method may provide for creation of a consumer-initiated personalized or individualized health or beauty product whereby a customer, from a customer data set database, may create a formulation based on diagnostic initiated from a formula creation algorithm using collected customer specific information through user provided data input and operatively directing a recommended unique formulation adaptable for the preparation of a made-to-order consumer-initiated individualized cosmetics, beauty care, nutrition, health or pharmaceutical products. In some examples, a production template with a final formulation recipe may be operatively directed as a recipe for operational control of an automated manufacturing cell in which each relevant specific selected formulation ingredients are combined and filled into the selected product packaging to create a finished product.

It is an advantage of the present invention to provide a system that is capable of providing a true personalized formulation customized for a user's identified needs.

It is another advantage of the present invention to allow for personalized product formulation that can depend upon individual needs, preferences, ingredients, fragrances, concentration, or otherwise individualized to a selecting consumer.

It is still another advantage of the present invention to enable a consumer to direct an individualized product formula to create a customized beauty product for their individual needs using an advanced algorithm for true customization.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 and, continued on FIG. 6 are process flow diagrams of the process according to the preferred embodiment of the present invention capable of formulating millions of different formula variations rapidly depending on individualized customer input.

DESCRIPTION OF THE PREFERRED EMBODIMENTS

Figure 1:
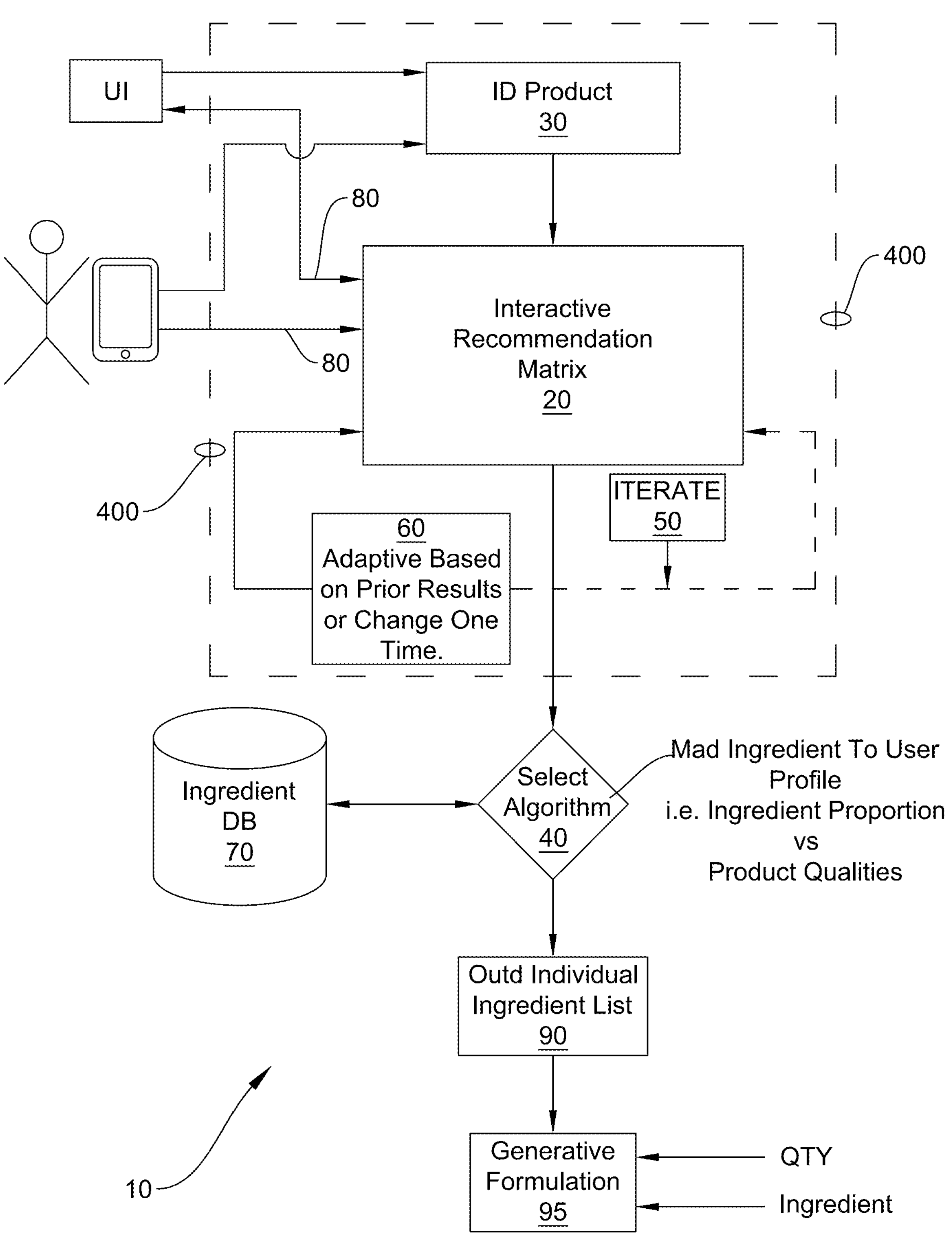
FIG. 1 is a flow diagram for a method of creating individually personalized formulated product according to the preferred embodiment of the present invention.

The best mode for carrying out the invention is presented in terms of its preferred embodiment is described and depicted herein in conjunction the drawings, wherein like reference numerals indicate the same parts throughout the several views. Referring now to FIG. 1, a method of creating individually personalized formulated product, generally noted as 10, is shown in which an interactive recommendation matrix 20 is implemented for a particular product selection 30. The interactive recommendation matrix 20 may be enabled using an online, direct to consumer portal, or may be enabled using a kiosk or other retail positioned user interface. Product selection 30 may be in any manner that allows a consumer to initiate and confirm a buying decision in which a selection is made to procure a customized or individualized product.

A product selection may be from a range of possible product types and/or package sizes. For purposes of the present invention a product will be referred to as a cosmetic or a beauty care product; however, such a description is meant to be exemplary only and not limiting, and as such the terms "cosmetic" or "beauty care product" should be broadly construed to encompass any topical agent for hair, skin or nails, as well as medicaments, vitamins, supplements, nutritional products, sports or energy drinks or any similar or equivalent consumer product more broadly and the present invention may be equivalently transferrable to any formulated product that can be customizable based upon user initiated use criteria.

The interactive recommendation matrix 20 may provide an iterative interface in any manner that solicits intended user and/or desire product character as an input to a selection algorithm 40. The interactive recommendation matrix 20 may further provide an iterative function 50, cycling a user through input selections that may change depending upon subsequent inputs. Additionally, the interactive recommendation matrix 20 may be adaptive 60, in which prior input selections may be modified based on change factors, such as season, availability of ingredients, prior experience (i.e., feedback from prior purchase), consumer preferences (i.e., non-gmo, organic, vegan, cruelty free, etc.) or the like.

The selection algorithm 40, whether modified by iterative 50 or adaptive 60 choices, accesses an ingredient database 70 and maps possible ingredient selections to the results of the interactive user input 80. Upon completion of the selection recommendation matrix 20 the selection algorithm 40 maps individual ingredients to the generated user profile and provides an output 90 of a formulation, recipe, quantitative list of individual ingredients or other functional equivalent that is used to generate an individualized production formula 95.

Figure 2:
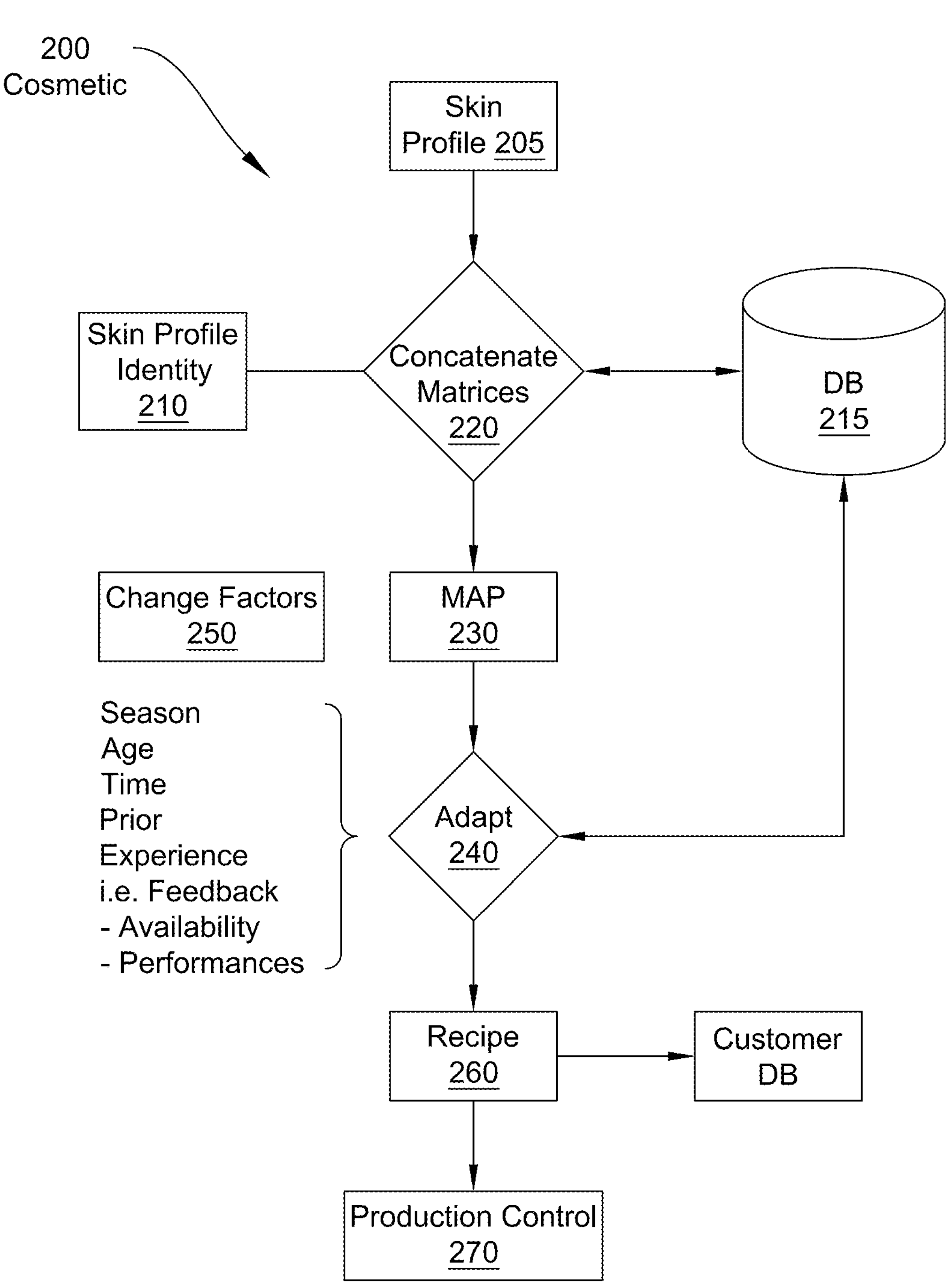
FIG. 2 is a flow diagram of the method of FIG. 1 for an exemplary use case.

Referring now in conjunction with FIG. 2, this method is better described for an exemplary use case, namely, for selection and formulation of a cosmetic type product generally notes as 200. Herein the interactive recommendation matrix 20 is adapted specifically for cosmetics and may result in a skin profile 205 used to generate a series of skin profile identifiers 210. By way of example, and not meant as a limitation, the product types may include any type of cosmetic or health and beauty product such as facial cream, hand cream, foundation, lip balm, shampoo, body milk, etc. The skin profile may be in the form of a matrix that corresponds skin profile identifier to select products ingredients from an ingredient database 215. The user skin profile matrix may be one way of documenting a user's skin profile. The user skin profile matrix may be a multidimensional matrix, in that different data points of the user's skin profile may indicate an intersection or correlation of two, three, or more skincare factors. For example, a user's skin profile may include the correlated or intersecting skincare factors of being 19 years old, having oily skin, and living in a high humidity climate. Although each of these factors may be accounted for individually in multiple skincare products, when the intersecting skincare factors are simultaneously accounted for, a more effective skincare recommendation and product or product line may be provided to the user. Further, the user skin profile matrix and correspondingly, the skin profile identifier may be concatenated 220 to particular features and used to identify which ingredients which may best address the intersecting skincare factors of the user. Once complete, a recipe map 230 can be generated. While the initial recipe map 230 may be used, according to one aspect of the invention the map 230 may be adapted based a number of change factors 250. These change factors 250 are intended to allow a user to modify the map 230 with additional or different ingredients 215 to generate a final recipe 260 that is associated with the control of production 270. Further, the user's order, contact information and preferences may be accumulated in a customer database 290 so as to allow a user to repeat a prior order or modify a prior order as based upon product experience.

As indicated the modification of the initial map can and should be broadly construed. Anything that may affect the performance of the cosmetic (e.g., seasonal changes, altitude, water alkalinity, etc.) which may affect the user's skin, or the performance of the product may be utilized.

Figure 3:
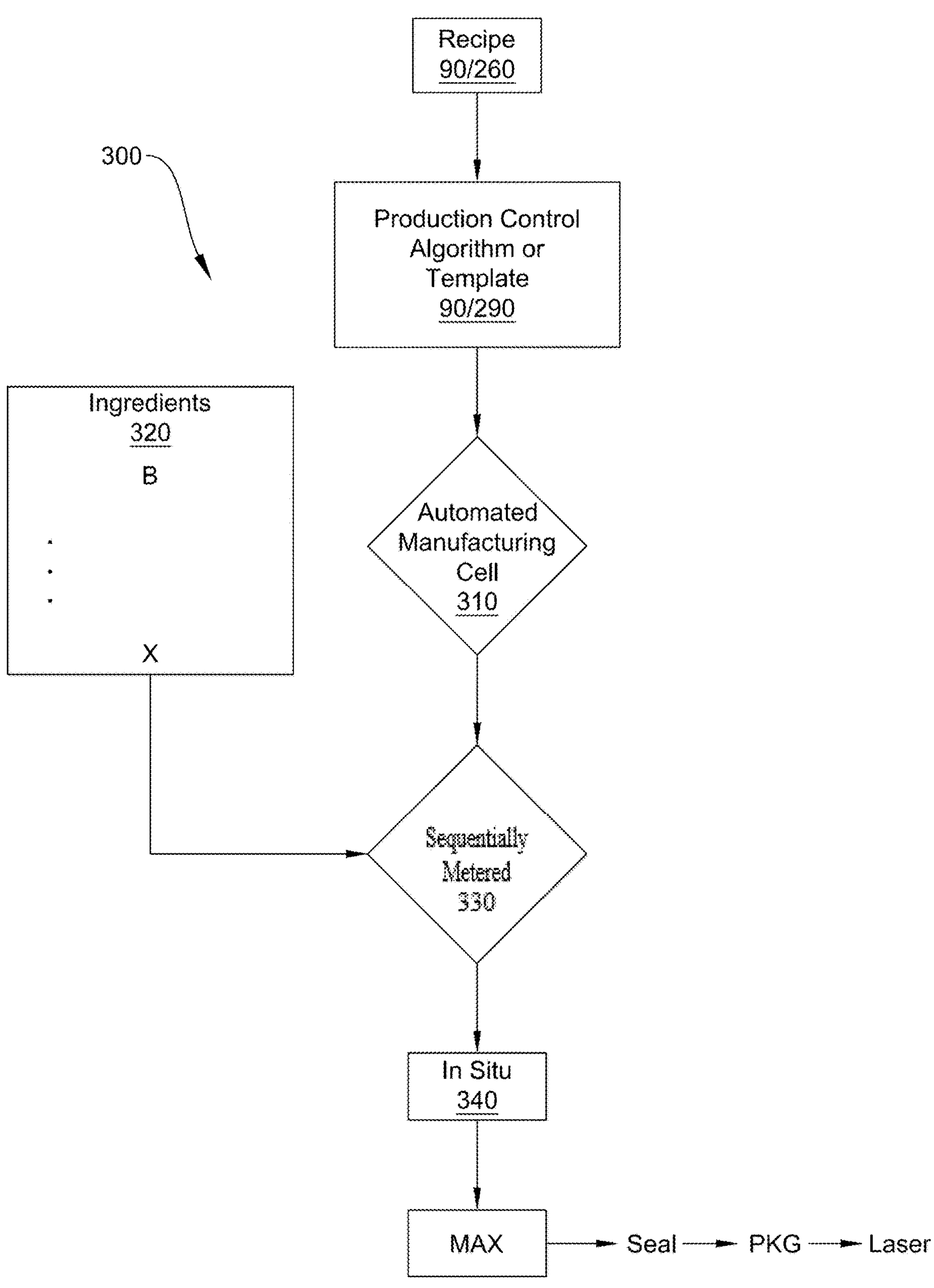
FIG. 3 is a flow diagram of a method for producing the individually personalized formulated product according to the preferred embodiment of the present invention.

Whether creating a more generally individually personalized formulated product of FIG. 1 or using the exemplary use case of a cosmetic of FIG. 2, as shown in conjunction with FIG. 3 a method for producing the individually personalized formulated product, generally noted as 300, is shown. The individualized recipe 90/260 is adapted through a production control algorithm or template 95/290 to control an automated manufacturing cell 310 incorporating a suitable programmed industrial robot, including or incorporating dosing and dispensing type robots. There the individually identified and selected ingredients 320 may be sequentially metered 330 into an in-situ product container 340 said container system that may comprising an outer housing forming a final consumer retail package and a filling insert contained within the outer housing and having a fillable upper orifice opposite a closed and movable bottom. The container may further include an integrated mixer accessing the filling insert through the bottom such that when a formulation is completed, the container can be sealed 360, mixed 350 and packaged 370 and integrated directly as a final retail or consumer package for labeling 380 and delivery.

Figure 4:
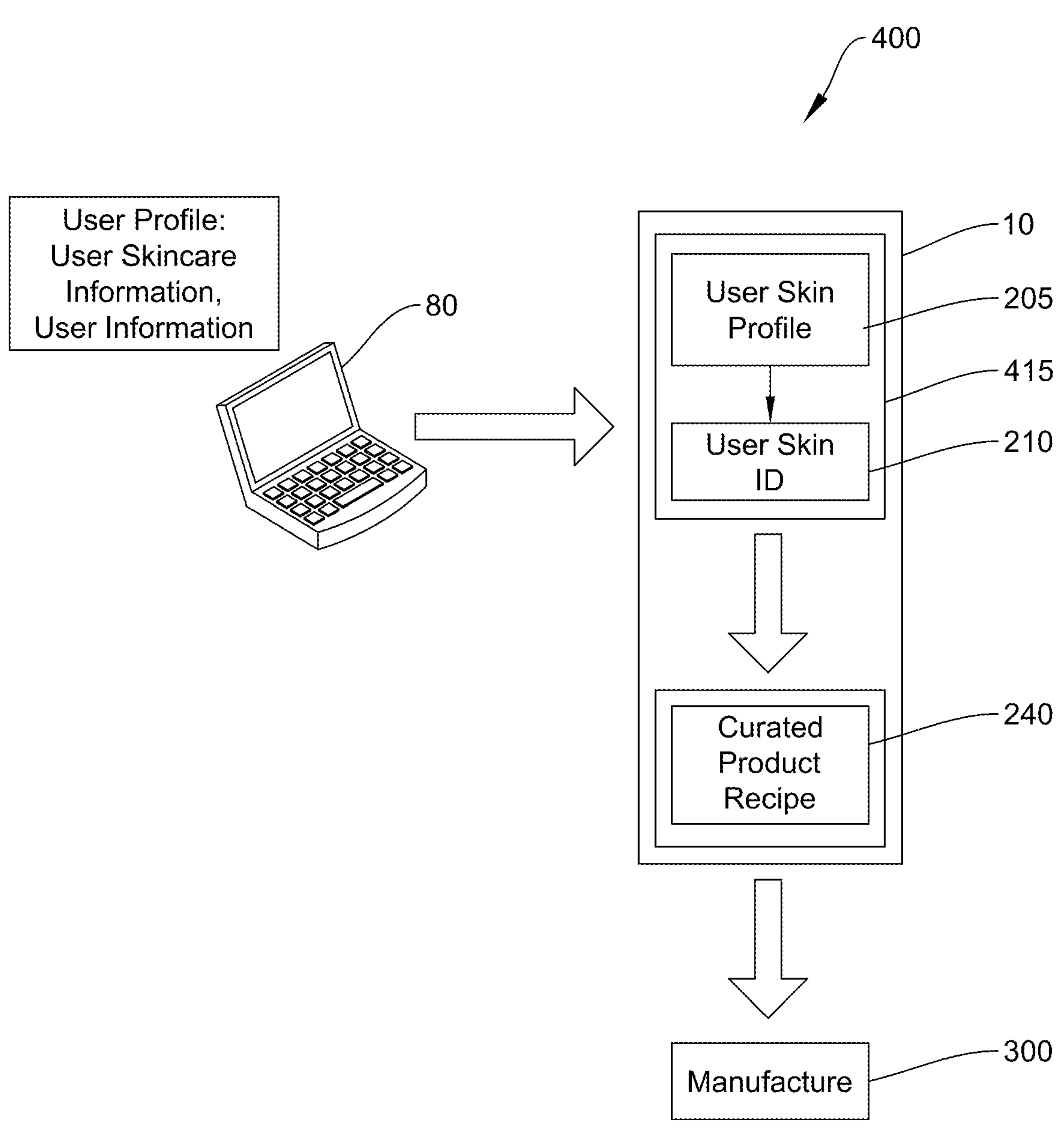
FIG. 4 illustrates an example of a skincare recommendation data flow process.
Figure 6:
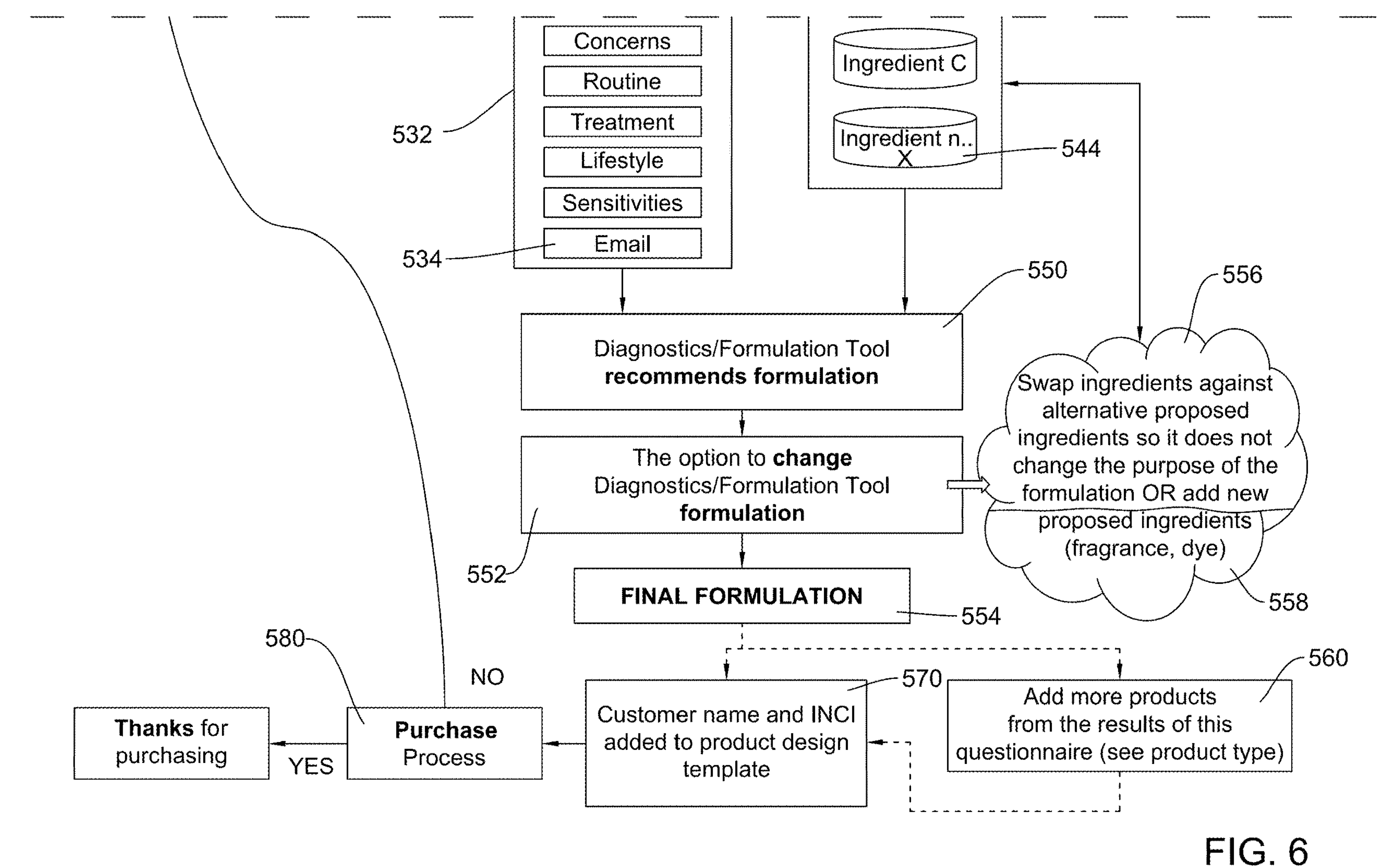

It may be appreciated that the user interface 80 may be any can be any suitable personal or commercial electronic device and may include, without limitation or express requirement, a processor, volatile or non-volatile memory, and a display. Example electronic devices include, but are not limited to: laptop computers; desktop computers; wearable devices; cellular phones; tablet computing devices; and so on. Or, it may not be required of all embodiments but is merely intended to transact data or information with, and/or provide input(s) to, the host server configured to enable the interactive recommendations and generate a unique formulation based thereon. In reference to FIG. 4, an example of a data flow process 400 is shown, which may include a skincare system 405. In some examples, the skincare system 405 may be configured to receive, process, output, and transmit various types of data which may be skincare related or non-skincare related. In the example of FIG. 4, the skincare system 405 may facilitate receiving user data by a processing block of the skincare system 405. The processing block 415 of the skincare system 405 may receive the user data and may prepare a curated product recipe 430. Generally and as illustrated in FIG. 4, the skincare recommendation data flow process 400 may include an input device 410. The input device 80 may be configured to provide the user with a dynamic questionnaire, for example, via an application or a website. The user skincare data entered at the input device 80 may be provided to the system 10. The skincare system 405 may be provide, via the processing block 415, a user skin profile which may be documented by employing a user skin profile 205. The skin profile 205, via the processing block 415, may then be translated into a user skin profile identifier 210, which may be representative of different user skin profile factors. The processing block 415 may include a user characteristic profile 205 which may be used in conjunction with the user skincare data to generate a user skin identifier 210. The user skin profile identifier 210 may then be used, via the processing block 415, to select a curated product recipe 430 for the user.

Referring now the product customization process, generally noted as 500, is preferably enabled using an online, direct to consumer portal 512 where the consumer confirms a buying decision 514 in which a selection is made to procure a product 516 or merely provide contact information 518 for addition to a customer database 519 for access during later communication. When a procurement decision 516 is made, the customer confirms the decision to prepare and purchase an individualized cosmetic, beauty care, nutrition, health and pharmaceutical (for purposes of the present invention, referred herein generally as "cosmetic") product by identifying a product selection 520 whereby a range of possible product types may be presented 522. By way of example, and not meant as a limitation, the product types may include any type of health and beauty product such as cosmetics, foundation, facial cream, hand cream, lip balm, shampoo, body milk, etc. For purposes of the present invention, "health and beauty" products are to be broadly construed as health product or beauty product, interchangeably, or their equivalent. By way of example, and not meant as a limitation, any topical agent for hair, skin or nails, as well as medicaments, vitamins, supplements, nutritional products, sports or energy drinks or any similar or equivalent consumer product.

Once the product type 522 is selected, while it is intended that one or more standard product packaging selections may be provided, in a preferred embodiment a user may further be provided with the option of selecting a product packaging 524. Product packaging selection may comprise any number of different options of packaging size and/or configuration.

Optionally, an expedited method of selection, generally noted as 526, may be provided directing a customer directly to primary product selection, bypassing product selection 520 that would otherwise require product type 522 and product packaging selections 524 and thereby allowing the customer to access directly a diagnostic process 528 as described in greater detail below. The ability to have such an expedited, bypass entry into the diagnostic process 528 may allow for a manufacture to advertise a specific product selection and direct a customer directly to the personalization process. By way of example for purpose of clarity, and not meant as a limitation, the system 500 is shown herein with two separate ways of entering the diagnostics: either via choosing a product and size first; or, by directly clicking on a priority product. Such a bypass selection may thereby be utilized in online or social media advertising such that when a consumer clicks on advertisement for a product, they are directed straight into diagnostic quiz for such an advertised product.

Once a product selection has been made, a formulation diagnostic tool 528 may be initiated in which a diagnostic process initiates a formula creation algorithm. The diagnostic process 528 may include a front-end diagnostic tool 530 and a formula creation algorithm 540.

The front-end diagnostic tool 530 may comprise a customer interface for collection of customer specific information 532 through user provided data input. Such information 532 may include demographic related information (e.g., name, age, gender, etc.) as well as other customer selected criteria such as goals, concerns, routines, existing treatments, lifestyle elements, sensitivities or the like. A user identifiable sobriquet 534 may further be prompted for and accepted, such as a username or email address or similar customer identifier that to the customer database 519 allowing a customer to easily reorder for subsequent purchases and/or provide a bypass interface starting point 526 for direct use or for alteration during subsequent visits.

The front-end diagnostic tool 530 may provide operative communication with the formula creation algorithm 540. The inputting and receipt of user preferences 532 may be accessed iteratively and a formulation database 542. The front-end diagnostic tool 530 may function by a quiz format (i.e., question or prompt to the user for an answer) in order to facilitate a personalized formulation. Personalized formulation for a health and beauty product may comprise prompts for a number of different parameters, both user oriented and ingredient oriented. By way of example, and not meant as a limitation, in the formulation of shampoo or body lotion the parameters for formulation may include hair type, texture, hair density, scalp moisture, treatment (color/bleach, etc.), hair goals (color, volume, rescue, heat protection, etc.). Similarly, in response to the various inputs to customer specific information 32 the formulation database 542 may select ingredients and ingredient amounts for a variety of appropriate ingredient selections 544.

The net result of the front-end diagnostic tool 530 initiating the formula creation algorithm 540 is the creation of a recommended unique formulation 550 adaptable for the preparation of made-to-order beauty care, nutrition and health products. It is further intended that once an initial formulation recommendation 550 is presented, the customer may be provided with an option to adjust or modify 552 the recommended formulation 550 in order to resolve a final formulation 554. During the formulation adjustment 552 it is preferred that particular ingredients 544 that are selected may be replaced with alternative proposed ingredients. It is further preferred that there be system limitations place on the replacement of ingredients 556 such that the purpose of the formulation ingredient is not significantly changes (e.g., oily, dry, combination, acne prone, sun sensitive, sensitive, allergy tested, poor texture, large pores, etc.). Further still, the inclusion of additional non-active ingredients 558, such as fragrances, dyes or the like may be further facilitated.

Once a final formulation 554 is obtained, a user may be prompted to add additional products to an order 560. Such a prompt 560 may redirect the user back to purchase additional individualized cosmetic product from the selection interface 520.

Upon completion of the total number of final formulation selection 554, each final formulation 554 may be operatively directed as a template for production data 570 and communicated with a production system in which a final formulation 554 is directed as a recipe for operational control of an automated manufacturing cell in which each relevant specific selected formulation ingredients are combined and filled into the selected product packaging to create a finished product that may be conveyed to packaging and distribution. As part of the product data template 570 the customer's contact information and International Nomenclature Cosmetic Ingredient (INCI) information may be included to allows for rapid product formulation and efficient mass-customization.

Finally, once finalization of a customer's order is completed a purchase process 580 may be initiated to complete purchasing information and instruction from the customer.

2. Operation of the Preferred Embodiment

In operation, the product customization process 500 provides a capability of individually formulating millions of different formula variations rapidly depending on individual needs, preferences, ingredients, fragrances, concentration, etc. Each user's individualized selection is customized directly to the consumer's specific conditions, and every distinct individual may be provided a selection of products customizable and designed each specifically customized. Consumers are thereby enabled to mix their own product formula to create a customized beauty product for their individual needs using an advanced algorithm for true customization. The diagnostics tool and interface assists and guides the consumer to create a formula that addresses their own unique beauty and health needs and preferences, thereby providing the choice of a selection that makes the consumer the producer.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton*

*Davis Chemical,* 520 US 17 (1997) or *Festo Corp*. v. *Shoketsu Kinzoku Kogyo Kabushiki Co.,* 535 U.S. 722 (2002), or other similar caselaw or subsequent precedent should not be made if any future claims are added or amended subsequent to this patent application.

What is claimed is:

1. A computer-implemented method for manufacturing an individually personalized formulated product comprising the steps of:

obtaining information by:

receiving specific human-body factors provided by a user;

receiving environmental factors provided by the user; and obtaining external information from an accumulated data source;

generating a user profile comprising a set of profile factors based on the obtained user information and environmental factors;

deriving a product map from a database based on the user profile, the product map correlating profile factors with product ingredient characteristics;

generating a user-specific set of product ingredients based upon the product map;

adapting a product formulation based upon the user-specific set of product ingredients and feedback from the user of a performance of a prior individually personalized formulated product;

transmitting the adapted product formulation to an automated manufacturing cell;

receiving a first input to replace at least one ingredient in the user-specific set of product ingredients without changing a purpose of the adapted product formulation;

receiving a second input to add at least one non-active ingredient to the adapted product formulation;

manufacturing the individually personalized formulated product in the automated manufacturing cell; and applying user-specific labeling to the final product.

2. The method of claim 1, further implemented on a host service communicably coupled to a client device operated by a user and further comprising:

receiving user data from the client device at the host service; and transmitting manufacturing control information for manufacturing the individually personalized formulated product from the product formulation to the manufacturing system.

3. The method of claim 1, wherein said individually personalized formulated product is selected from a group consisting of: shampoo; hair conditioner; non-medicated scalp treatment products; non-medicated scalp treatment cream; hair oil; hair styling preparations; facial cleansers; cosmetics; foundation; facial moisturizers; non-medicated facial treatments; skin serums; night cream; facial masks; body soak for the bath; massage oil; moisturizing body oil; body moisturizer in the nature of creams and lotions; essential oils for aromatherapy; lipsticks; nail gel-polishes or other nail supplies; eye and facial masks; fragrances; deodorants; medicaments; vitamins; supplements; nutritional products; and sports or energy drinks.

4. The method of claim 1, wherein said set of profile factors is selected from criteria consisting of: demographic information, health information, lifestyle information, historical information, and a user identifiable sobriquet.

5. The method of claim 1, further comprising distributing the individually personalized formulated product to a consumer.

6. A method for creating a customized formulated product comprising:

receiving user-specific information from a client device of a user in communication with a host service;

generating a user profile based on the received user-specific information;

determining a set of product ingredients based at least in part on the user profile;

creating a manufacturing formulation for the customized formulated product from the set of product ingredients;

adapting the manufacturing formulation based upon the set of product ingredients and feedback from the user of a performance of a prior customized formulated product;

receiving a first input to replace at least one ingredient in the set of product ingredients without changing a purpose of the manufacturing formulation;

receiving a second input to add at least one non-active ingredient to the manufacturing formulation; and transmitting the manufacturing formulation to manufacturing system integrated with the user profile and configured for manufacturing the customized formulated product from the manufacturing formulation including dosing each ingredient of the product formulation directly into a container system, and when the formulation is completed, sealing, mixing and packaging the container as a final retail or consumer package.

7. The method of claim 6, further comprising:

said user-specific set of product ingredients are based, at least in part, on:

specific human-body factors provided by a user;

environmental factors provided by the user; and external information provided by the client device or from an accumulated data source; and deriving the set of product ingredients from a database correlating ingredient characteristics to the user profile associated with the user.

8. The method of claim 7, further comprising distributing a final product to the user further comprises labeling the final product with a customer's contact information and International Nomenclature Cosmetic Ingredient (INCI) information.

9. The method of claim 6, further comprising distributing a final product to a user further comprises labeling the final product with a customer's contact information and International Nomenclature Cosmetic Ingredient (INCI) information.

10. A method of providing a customized formulation of a formulated product to a user operating a client device in communication with a host service, the method comprising:

creating a user profile comprising a set of profile factors based, at least in part, on:

specific human-body factors provided by the user;

environmental factors provided by the user; and external information provided by the client device or from an accumulated data source;

deriving a product map, from a database, correlating to said profile factors;

generating a user-specific set of product ingredients based upon the product map; adapting a product formulation based upon the user-specific set of product ingredients and feedback from the user of a performance of a prior customized product formulation;

receiving a first input to replace at least one ingredient in the user-specific set of product ingredients without changing a purpose of the adapted product formulation;

receiving a second input to add at least one non-active ingredient to the adapted product formulation;

employing an automated manufacturing cell to manufacture at least one curated formulated product from the adapted product formulation;

wherein the manufacturing system is configured to automatically mix, process, and package the product based on the formulation;

transmitting, by the host service to the client device, identifying information associated with the at least one curated formulated product.

11. The method of claim 10, further comprising:

scheduling updates to an initial user skin profile, each update based, at least in part on, a respective anticipated environmental change to nonskin-related information of the initial user skin profile; and for each scheduled update to the updated user skin profile, the method further comprises creating a modified skincare product formulation comprising a user-specific set of skincare product ingredients that has been updated based on an updated user profile;

utilizing the automated manufacturing cell to produce at least one curated skincare product based upon the modified skincare product formulation;

utilizing the automated manufacturing cell to produce at least one curated skincare product based upon the modified skincare product formulation, where the cell is programmed to adjust its operation in response to the modifications in the skincare product formulation; and transmitting identifying information associated with the at least one curated skincare product from the host service to the client device.

12. The method of claim 10, further comprising generating an initial skin profile identifier by correlating the initial user skin profile to a user skin profile matrix.

13. The method of claim 12, wherein the user skin profile matrix is created by selecting a set of skin matrix factors that include at least one of a set of skin-related factors or a set of nonskin-related factors.

14. The method of claim 10, further comprising labeling the at least one curated formulated product.

* * * * *